United States Patent [19]

Barnsley

[11] Patent Number: 5,838,832
[45] Date of Patent: Nov. 17, 1998

[54] METHOD AND SYSTEM FOR REPRESENTING A DATA SET WITH A DATA TRANSFORMING FUNCTION AND DATA MASK

[75] Inventor: Michael F. Barnsley, Duluth, Ga.

[73] Assignee: Iterated Systems, Inc., Atlanta, Ga.

[21] Appl. No.: 415,559

[22] Filed: Apr. 3, 1995

[51] Int. Cl.$^6$ .................................................. G06K 9/36
[52] U.S. Cl. ............................................................ 382/249
[58] Field of Search .................................. 382/249, 248, 382/283, 232; 358/433, 467

[56] References Cited

U.S. PATENT DOCUMENTS

| | | | |
|---|---|---|---|
| 4,463,386 | 7/1984 | Goddard et al. | 358/432 |
| 4,941,193 | 7/1990 | Barnsley et al. | 382/249 |
| 5,065,447 | 11/1991 | Barnsley et al. | 382/249 |
| 5,347,600 | 9/1994 | Barnsley et al. | 382/249 |

OTHER PUBLICATIONS

Deterministic Rendering of Self–Affine Fractals, by Donald M. Monro et al, IEE Collog. (1990) No. 171: The Application of Fractal Techniques in Image.

On the Performance of Fractal Compression With Clustering, by Christopher J. Wein, IEEE Transactions on Image Processing, vol. 5, Issue 3, 1996.

A New Improved Collage Theorem With Applications to Multires, by G.E. Oien et al, ICASSP 94: Acoustice, Speech & Signal Processing. vol. V.

Pruning of the Transform Space in Block–Based Fractal Image, by Lester Thomas, ICASSP 93, Acoustics Speech & Signal Processing.

Image Compression Using Interated Function Systems and Evolutionary Programing: Image Compression Without Image Metrics, by Douglas A. Hoskins et al, IEEE Comput. Soc. Press, vol. U pp. 705–711, 1992.

Article Entitled "Image Compression, Making Multimedia Publishing a Reality", by Louisa Anson, in the Electronic Publishing section of CD–ROM Professional, Sep. 1993 issue.

Article Entitled "A Better Way to Compress Images", by Michael F. Barnsely and Alan D. Sloan, in the Managing Megabytes section of BYTE , Jan., 1988 issue.

Article Entitled "Fractal Image Compression", by Louisa F. Anson, in the Hands On Under the Hood section of BYTE, Oct. 1993 issue.

*Primary Examiner*—Joseph Mancuso
*Assistant Examiner*—Samir Ahmed
*Attorney, Agent, or Firm*—Morris, Manning & Martin, L.L.P.

[57] ABSTRACT

A system and method are disclosed for representing a data set by selecting a data transformation function and a data masking function. Preferably, the data set transformation and data masking functions are used to generate an attractor that more accurately represents the data set than an attractor generated by the data transformation function alone. The data masking function is a set of exclusionary data elements which are used to terminate data transformations for data elements which generate the attractor. Preferably, the data masking function is defined as a polygon for a two dimensional space. When the data masking function is incorporated with the data transformation function, the attractor normally produced by the data set transformation function is constrained to more accurately represent the data set. The data masking function may be used with any data transformation function including those comprised of complex, projective, affine maps, fractal transform, or fractal transform error function transformations. Deterministic and random iterative methods may be used to generate the constrained attractor that represents the data set to be represented.

63 Claims, 6 Drawing Sheets

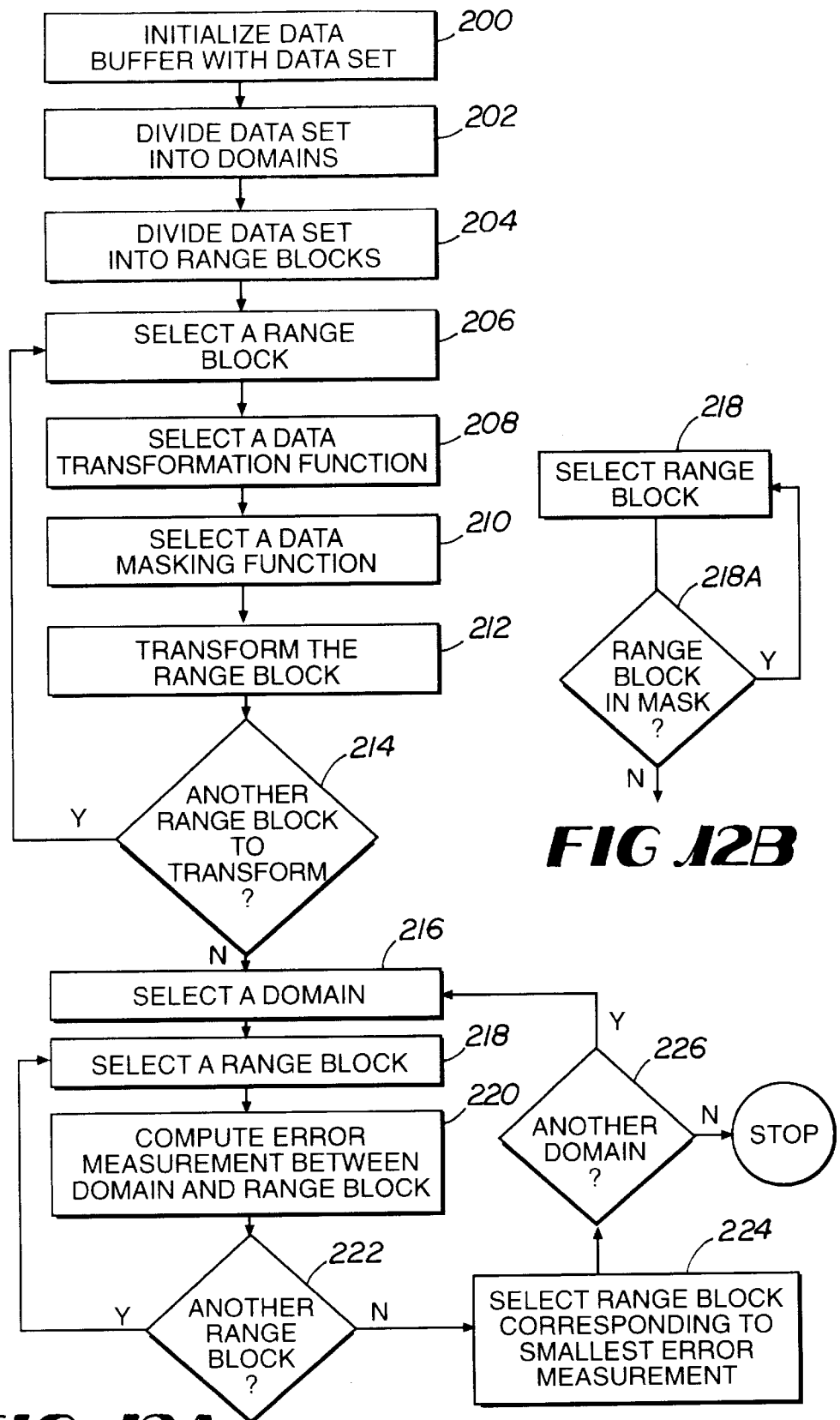

METHOD AND SYSTEM FOR REPRESENTING A DATA SET WITH A DATA TRANSFORMING FUNCTION AND DATA MASK

FIELD OF THE INVENTION

This invention relates to data transforming methods and, more specifically, to data transforming functions used to compress a set of data elements.

BACKGROUND OF THE INVENTION

Bandwidth limitations in various data transmitting media have led to the development of methods for "compressing" data. Compression generally refers to the representation of a set of data by using fewer elements than contained in the set to represent the set of data. If each data element within the set may be regenerated from the compressed representation then the method is commonly known as lossless. If the data representation regenerated from the compressed representation of the data set does not accurately represent each and every element within it, the method is known as lossy. Because the set of compressed data may represent all elements but contain fewer elements than the actual set represented, the transmission of the compressed data usually requires less time and fewer resources than if the original set of data was transmitted. Conversion of the transmitted compressed data set is called decompression and is usually performed by a receiver to obtain the original data set or a close approximation thereto. Thus, the compressed data must not only be capable of accurately representing the data set, but it must also contain sufficient information for the receiver to decompress the data representation.

One known method for compressing a data set uses a data set transformation function to represent a data set. The data set transformation function may be constructed out of projective, affine or complex transformation functions that, when applied to any data set in iterative fashion, converges to the same attractor. As a result, the coefficients of the data set transformation function may be used to represent a data set that is substantially the same as the attractor. Such a method is taught and disclosed in U.S. Pat. No. 4,941,193 to Barnsley et al., and is expressly incorporated herein by reference. The method taught and disclosed by that patent yields data compression ratios of greater than 12,000 to 1 in some applications.

Another known image and data compression method uses a fractal transform function to transform data. That method divides an image into range blocks and domains under predetermined conditions. The range blocks are then transformed by a data transformation function. The domain blocks may then be compared to the transformed range blocks to determine which transformed range block best matches each domain. Information about the transformations for each range block and the matching domain blocks are used to represent the original data set. This method is taught and disclosed in U.S. Pat. No. 5,065,447 to Barnsley et. al, and is expressly incorporated herein by reference. Alternatively, the transformation data function used to transform the range blocks and the original data set may be used to define an error function. Minimization of the error function defines coefficients which may be used to represent the original data set.

One problem with data compression methods which use data set transformation functions is the difficulty in efficiently adapting a known attractor or transformed range block so it accurately represents a data set that is somewhat different than the attractor or transformed range block produced by the data transformation function. This problem is especially noteworthy in the conversion of data sets which represent real world physical phenomena. For example, video images or accompanying soundtracks are typically produced at a predetermined rate such as thirty (30) frames a second. As a result, for real-time application there is a time limitation for selecting a data transformation for compressing the data. Previous methods have operated by selecting and modifying a data transformation function so the attractor or transformed range block conforms to an original data set or portion thereof. These methods then collect the data not represented by the attractor or transformed range blocks into a residual set. The residual set of data is transmitted with the coefficients of the data transformation for reconstruction of the original data set at the receiver.

The methods discussed above suffer from, at least, the following limitations. First, the residual data set may be quite large and, as a consequence, the efficiencies normally achieved by using data transformations functions are degraded. Second, the fractal transform method may consume much of the time allocated for compressing and transmitting data with testing the correspondence of a data set to an attractor rather than modifying the data transformation function so the attractor may more efficiently represent the data. Third, the coefficients generated from the minimization of the error function may not accurately depict the data or the real values of the coefficients may require so many digits for accurate representation that the compression achieved is relatively nominal.

What is needed is a way of efficiently adapting a data set transformation function which has a high compression efficiency so the attractor it produces more accurately represents a data set with few or no residual data set elements. What is needed is a way to simplify the representation of the data transformation function so the coefficients of the function may be accurately and efficiently represented.

SUMMARY OF THE INVENTION

The above identified problems have been overcome by a novel system and method that combines a data set transformation method with a data masking function. The inventive method includes selecting a data transformation function and a data mask which cooperates with the data transformation function to selectively exclude data elements from the attractor or transformed range block otherwise produced by the data set transformation function. Such a method permits a data transformation function to be efficiently adapted so the attractor or transformed range block more accurately represents the original data set. As a result, a residual data set may not be necessary or the number of elements in such a set may be substantially reduced. Once an appropriate data transformation function and masking function have been selected, they may be used to more efficiently compress and decompress the data than known methods.

The inventive method may be utilized with many data transformation function systems such as those comprised of projective, complex, affine map, fractal transform, or error function fractal transform transformation systems. Such systems may be used in a variety of applications. For example, a data set transformation that produces a graphical shape that resembles a waveform may include extraneous information or non-real world data such as more than one value for a given input. This extraneous information prevents the data transformation function from accurately representing the physical data. By using the system and method of the present invention, the attractor of the data transformation function may be adapted by a masking function to constrain the attractor or transform a range block so it more accurately represents the physical data. Rather than provide data elements which represent discrete values of a soundtrack or pixel elements for a video image, the data set transformation function and masking function may be used to accurately define the data set with a small or no residual data set.

Other applications may include using a data masking function to filter undesired data elements from an original data set. Additionally, a data masking function may be used to enhance or modify aesthetically pleasing designs created by a computer driven generator to expand the permutations of designs possible with such a generator.

To decode data compressed with data transformation and masking functions, a receiver simply uses the coefficients of the transformation function and the definition of the data masking function to reproduce the attractor or transform a data set using a fractal transform. The inventive methods for generating an attractor using a data masking function include a random iteration method, a deterministic method, and a fractal transform method. The attractor may then be used to reproduce the original data set such as a video frame or soundtrack waveform. Thus, physical data such as image and sound data may be more efficiently communicated between locations. By combining a masking function that excludes data with one that transforms data within a data space, data sets may be efficiently compressed. That is, the number and size of the data transformation function coefficients and the size of a residual data set may be substantially reduced.

These and other features and advantages of the present invention may be more clearly understood and appreciated from a review of the following detailed description and by reference to the appended drawings and claims.

BRIEF DESCRIPTION OF THE DRAWINGS

The present invention may take form in various components and arrangement of components and in various steps and arrangement of steps. The drawings are only for purposes of illustrating embodiments of the invention and are not to be construed as limiting the invention.

FIG. 12A is a logic diagram of a fractal transform process used to encode a data set using data transformation and data masking functions to transform range blocks within the fractal transform process; and FIG. 12B is a logic diagram of a modification to the process shown in FIG. 12A.

DETAILED DESCRIPTION OF THE INVENTION

Figure 1:
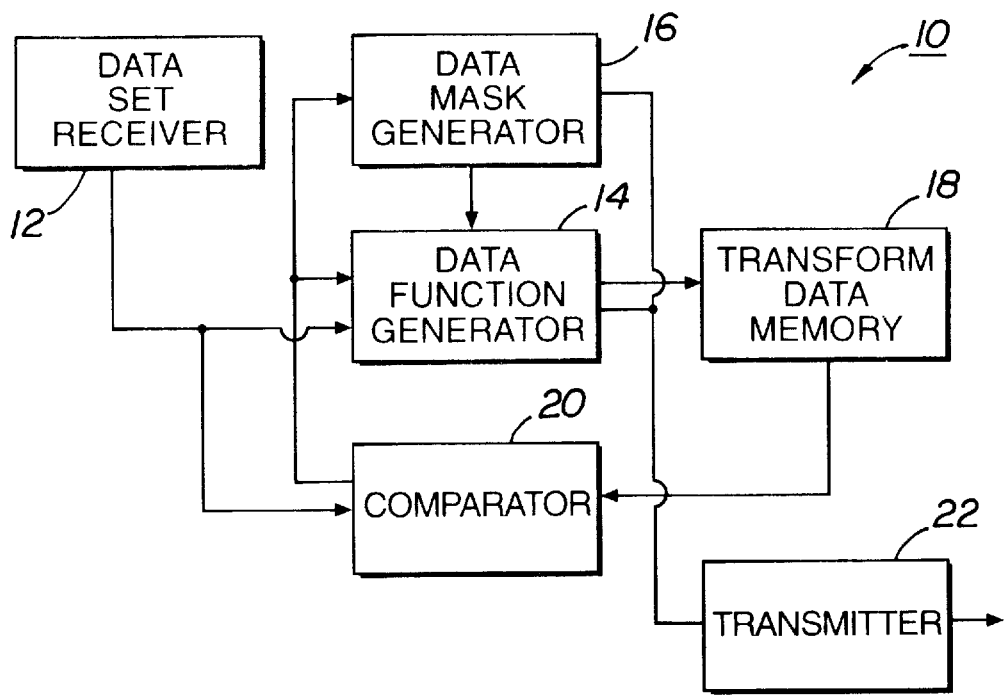
FIG. 1 is a block diagram of a data compressor which incorporates the principles of the present invention.

A data compressor incorporating the present invention is shown in FIG. 1. The compressor 10 includes a receiver 12 for receiving data elements of a data set to be represented, a data function generator 14 for generating a data transformation function and attractor, a data mask generator 16 for generating a data masking function, a transform data memory 18 for storing transformed data, and a comparator 20. Data transform function generator 14 selects a data transformation function and uses the data masking function provided by mask generator 16 to generate an attractor. Comparator 20 compares the attractor in memory 18 to the data set in receiver 12 to determine whether the data transformation and masking functions accurately represent the data set in receiver 12.

A data set transformation function used by data function generator 14 may be singular or a set of transformation functions. Each transformation function has a finite set of coefficients. Examples of such data set transformation functions include complex, affine, or projective transformations. Any of the data set transformation functions generated may be either lossy or lossless data set transformation functions. Function generator 14 may also select an iterated function system to generate an attractor by using the method disclosed in U.S. Pat. No. 4,941,193. Selection of the coefficients for any data set transformation function may be under the control of either an operator or a predetermined selection method.

Figure 2:
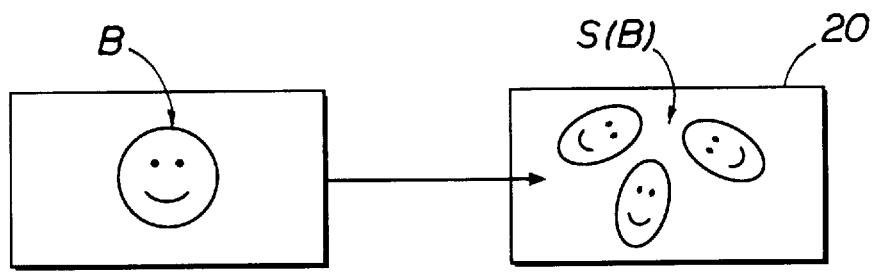
FIG. 2 is an example of the results of a data transformation function acting on a data set.

An example of a data set transformation acting on a data set is shown in FIG. 2. There an original data set, B, includes the pixel elements which graphically represent the image shown in the figure. A data set transformation function, S, may be comprised of a plurality of data element transformations, Wi for i=1,2,3 ... N, which may act on the data elements of the original data set to generate a new data set. The image in FIG. 2 is transformed by three transformations comprising a data transformation function to produce the image 20.

The operation of a transformation function on set B is symbolically represented as $$S(B) = \bigcup_{i=1}^{3} Wi(B).$$

That is, a transformation of a data set B is equal to the union of the operation of the three data transformations on the original set B. If the data set transformation function S is iteratively applied to the previous S(B) then the resulting transformations may converge to an attractor. Certain attractors may be generated by the iterative operation of a transformation function regardless of the data set on which the function first acts. In such a case, the coefficients of the transformation function, S, may be used to represent the attractor. Because the elements necessary to define the coefficients of the transformations comprising S are usually less in number than the elements of the original data set, S is a data transformation that compresses the original data set. Another possible data function is a data transformation function with a condensation set. Such systems are well-known.

Data function generator 14 uses the data masking function received from data mask generator 16 to transform data elements through one or a combination of the transformation processes discussed in more detail below. Additionally, data function generator 14 may include memory for receiving data elements from receiver 12 which may be analyzed to select a data transformation function. Data function generator 14 also includes a processor for receiving error distance measurements or minimized error function coefficients from comparator 20 which may be used in accordance with known methods to modify the coefficients of a data transformation function. Alternatively, data function generator 14 may incorporate the transform memory 18.

Mask generator 16 of FIG. 1 selects a data masking function which cooperates with a data set transformation function in the processes discussed below to constrain the attractor normally produced by a data transformation function. The data masking function defines a set of exclusionary data elements. These data elements are used to control the application of the data transformation function to a set of data elements so the attractor otherwise generated by the transformation function altered. Thus, the attractor may be altered to more accurately represent the original data set by modifying either the data transformation function or the data masking function or both. The data masking function may be defined by an operator using a mouse as discussed in more detail below or selected from a set of masking functions based on an analysis of the data set to be represented. The data contained in receiver 12 may be displayed on a screen device or the like (not shown) to assist an operator in interactively selecting data transformation and data masking functions.

Likewise, data mask generator 16 includes a processor for receiving error distance measurements or minimized error function coefficients from comparator 20 which may be used to alter the data masking function. For example, where an attractor contains extraneous data, the exclusionary set of data elements defining the data mask may be expanded to include more elements to further constrain the attractor. Likewise, if the attractor lacks data elements present in the data set to be represented, then some of the data elements comprising the data mask may be removed. The addition or deletion of data elements in the data mask may be done interactively, for example, by displaying the mask and attractor over the data set to be represented and allowing the operator to redefine the data mask by redefining a set of elements graphically. Alternatively, the processor may alter the function description of the mask to change the data mask definition. For example, if the data mask is defined as a polygon, the mathematical function describing the polygon may be changed to reduce or increase the perimeter or shape of the polygon.

Transform data memory 18 and comparator 20 are used to evaluate the data transformation and data masking functions selected by function generator 14 and data mask generator 16, respectively. To perform the evaluation, the data space of transform data memory 18 is transformed to an attractor generated by the selected data transformation and data masking functions which preferably operate according to one of the processes discussed in detail below. Comparator 20 compares the attractor in memory 18 to the original data in memory 12 to calculate an error measurement. Preferably, the error measurement may be a Hausdorff distance between the data set in receiver 12 and the attractor in memory 18. Such a measurement is well known. Other possible error measurements which may be used are Hamming and root mean square measurements.

The error measurement is preferably provided to data transformation function generator 14 for modifying the data transformation function or to the data masking generator 16 for modifying the data masking function. These modifications are preferably optimized by generating an error function which may be minimized by using a neural network technique, an annealing method, or genetic algorithm, all of which are well-known. Alternatively, a display may be generated which overlays the attractor over the original data set so an operator may interactively modify the data transformation function or data masking function to improve the correspondence between the two as discussed above.

If the error measurement is less than a predetermined threshold, comparator 20 generates a signal indicative that the selected data transformation and masking functions adequately represent the original data set. Following receipt of that signal, data function generator 14 and masking function generator 16 transfer the coefficients which define the data transformation and the coefficients or data elements which define the data masking function to transmitter 22 for transmission to a remote site for decompression.

Figure 3:
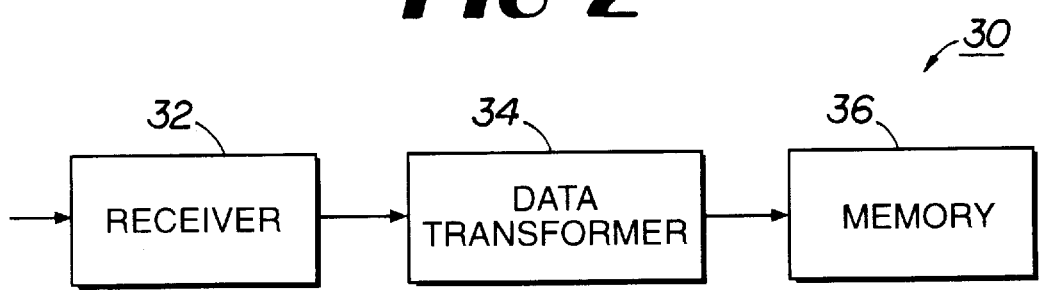
FIG. 3 is block diagram of a data decompressor which incorporates the principles of the present invention.

A decompressor 30 for the inventive system 10 of FIG. 1 is shown in FIG. 3. The decompressor 30 includes a receiver 32 for receiving the data defining the data set transformation and data masking functions, a data transformer 34 for using the data set transformation and masking functions to generate the attractor which represents the original data set, and a memory 36 for storing the generated attractor. The data transformer preferably uses one of the processes discussed in more detail below to regenerate the attractor that represents the original data set. The data stored in memory 36 may be used to drive a video display, sound reproducing components, or other data applications.

Figure 4:
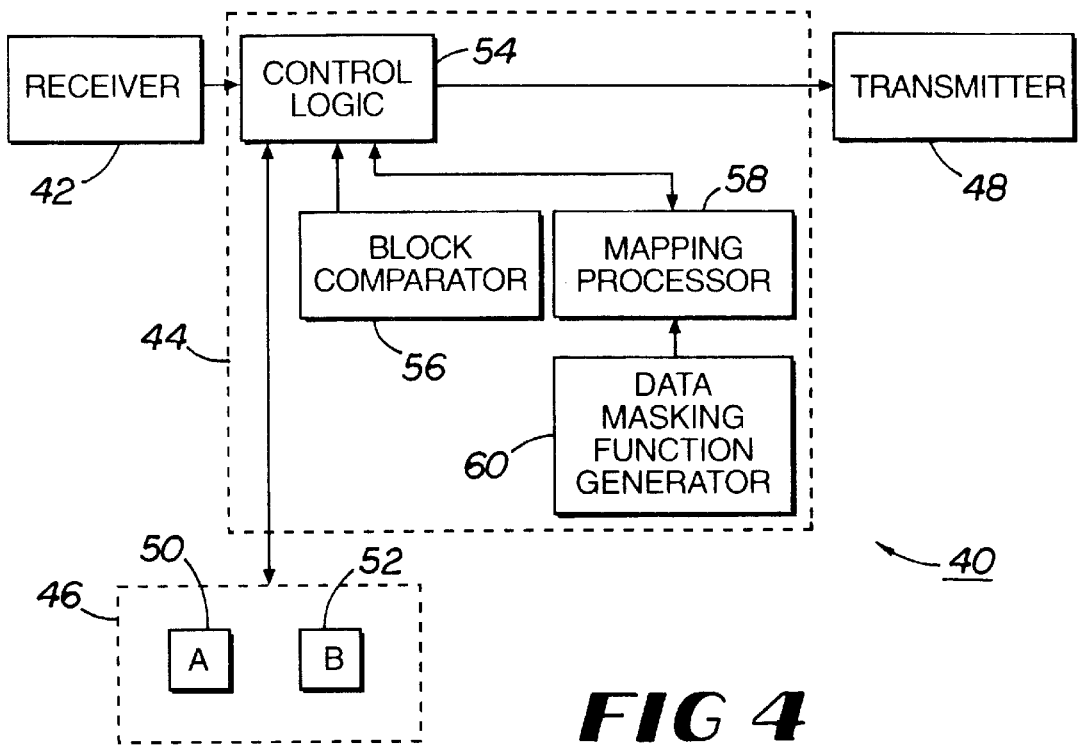
FIG. 4 is a block diagram of a data compressor which incorporates the principles of the present invention for a fractal transform method.

A block diagram for an embodiment of the present invention which may be used with a fractal transform method is shown in FIG. 4. That system 40 includes a receiver 42, a data processor 44, transform memory 46, and transmitter 48. The receiver may be any type of device which receives data elements for a data set to be represented. Transform memory 46 includes two buffers. Buffer 50 is used for storage of domain blocks and buffer 52 is used for storage of range and transformed range blocks. Transmitter 48 is used to transfer the transformed data which represents the data set to another device.

Data processor 44 includes control logic 54, block comparator 56, mapping processor 58, and data masking function generator 60. Control logic 54 executes programs which initiate block comparisons and mapping functions in mapping processor 58. Specifically, after a data set has been received by receiver 42, control logic 54 divides the data set into domain and range blocks which are stored in buffers 50, 52, respectively.

Additional range blocks are generated by mapping processor 58 using data transformations functions. Preferably, the data transformations used by mapping processor 58 include pixel number, pixel value, or pixel arrangement transformations. Pixel number transformations include contractive mapping functions, pixel group averaging functions and the like. Pixel value transformations include attenuation of pixel value functions, inverting pixel value functions, or the like. Arrangement transformations include rotation of pixel group functions or the like. Mapping processor 58 also uses data masking functions provided by data masking generator 60 to transform the range blocks. These transformed range blocks are stored in buffer 52 for comparison to the domains stored in buffer 50. By using the data masking function of the present invention with a data transformation function, the mapping processor 58 may generate transformed range blocks which more closely match the domains. As a result, the fractal transforms generated by system 40 more accurately represent the data set in receiver 42.

Figure 5:
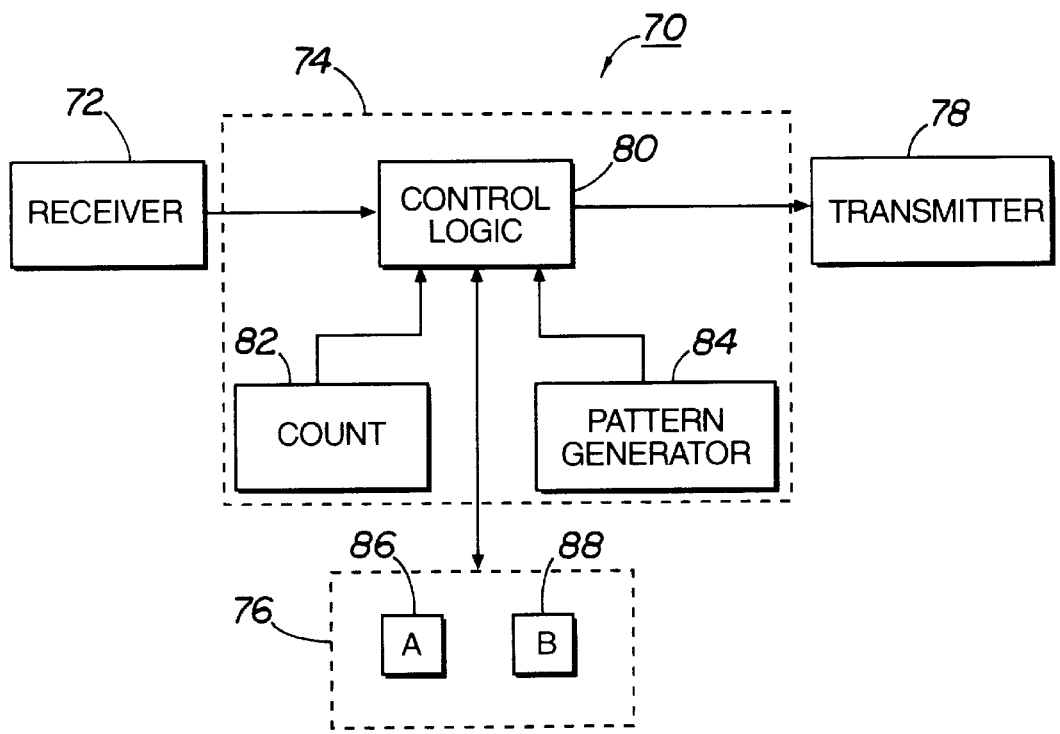
FIG. 5 is block diagram of a data decompressor which incorporates the principles of the present invention for a fractal transform method.

A decompressor 70 for system 40 of FIG. 4 is shown in FIG. 5. The decompressor 70 includes a receiver 72 for receiving the data defining the data set transformation and data masking functions, a data transformer 74 for using the data set transformation and masking functions to generate the attractor which represents the original data set, a memory 76 for storing transformed data which converges to the attractor, and a transmitter 78 for delivering the data elements of the generated attractor to another device. The data elements of the attractor may be used to drive a video display, sound reproducing components, or other data applications.

Data transformer 74 includes control logic 80, a count buffer 82, and a pattern generator 84. Control logic 80 executes a program to retrieve the identifiers for the data transformation and data masking functions along with the range block identifiers from receiver 72. A buffer 86 is initialized with predetermined set of data elements provided by pattern generator 84. Control logic 80 transforms the predetermined data set in buffer 86 by using the data transformation and data masking functions identified by the identifiers retrieved from receiver 72 and stores the transformed data elements in buffer 88. The transformation process is repeated using buffer 88 as the source and storing the transformed elements in buffer 86. This process continues for the number of times stored in count buffer 82. At that time the attractor in the buffer containing the most recently transformed data elements represents the original data set.

Preferably, the systems described above which use the processes described below are implemented in Visual Basic which runs under a Windows operating system, available from Microsoft of Redmond, Wash., in enhanced mode. A computer system which supports such an implementation requires an Intel 80386 processor or equivalent with at least 4 megabytes of random access memory (RAM) and a disk drive having at least 20 megabytes of space available. Any monitor compatible with such a system may be used.

Figure 6:
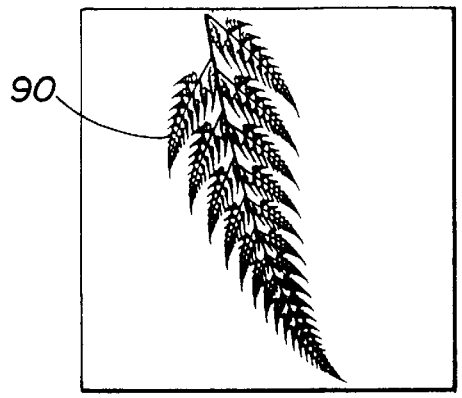
FIG. 6 illustrates an object accurately represented an attractor produced by the data transforming function shown in FIG. 7.

An attractor which resembles a real world object, a black spleenwort fern, is shown in FIG. 6. This attractor may be generated by a known data transformation. As can be observed from FIG. 6, the attractor appears to have an infinite number of fronds as it progresses to its lowest end and each frondlet of each frond appears to have an infinite number of substructures at the end of each one. Attractors having this type of structure arise from iterative transformation methods because successive iterations of data transformations result in data values which tend to approach a finite value even if the iterations continued infinitely. For that reason, the additional change from one iteration to the next may be measured and when the overall difference falls below a predetermined threshold, the iterations may be terminated. For example, the rate of change in a Hausdorff distance from one iteration to the next in the generation of an attractor may be used to determine when a sufficient number of iterations have been performed.

Figure 7:
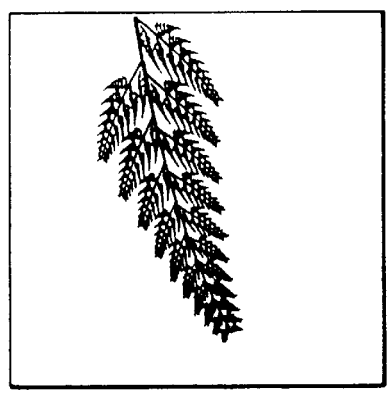
FIG. 7 illustrates the affine maps which may be used to generate an attractor that represents the object shown in FIG. 6.

The affine maps, A, B, C, and D, of a data set transformation function which may be iteratively applied to a data set to generate the attractor in FIG. 6 are shown in FIG. 7. A number of methods may be used to generate the attractor such as the random iterative and deterministic methods discussed more fully below. The method and system for selecting these affine maps and for generating an attractor without the use of a data masking function are disclosed in U.S. Pat. No. 4,941,193.

Figure 8:
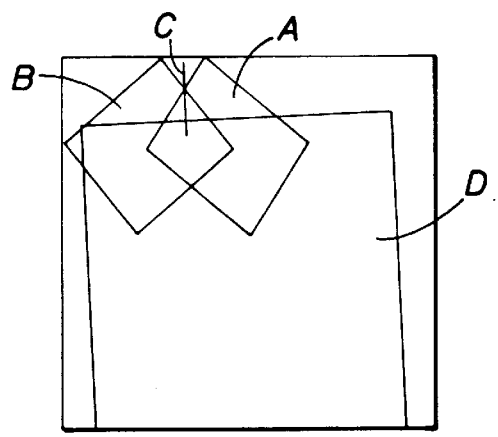
FIG. 8 illustrates an object having structure not accurately represented by the attractor generated by the affine maps shown in FIG. 7.

The object depicted in FIG. 8 is not accurately represented by the data set transformation function comprised of the affine maps shown in FIG. 7. As one can observe from the figure, this fern has a finite number of fronds and each frond has a finite number of frondlets. If the coefficients of the data transformations represented by the maps of FIG. 7 are modified, an attractor having a structure which asymptotically approaches a limit at the boundaries of the object still emerges. Nor could the truncated boundaries be generated by simply limiting the number of iterations to produce the attractor since the iterations do not necessarily produce the attractor from the interior of the object to the boundaries. While the fern of FIG. 8 contains less information than the fern of FIG. 6, there currently is no known way of limiting the attractor and still efficiently represent the transformation function that generates the attractor.

The system and method of the present invention constrains the attractor in FIG. 6 by use of a novel data masking function. The masking function is a set of data elements which are used in the data transformation method to alter the process so as to exclude data elements from the attractor during data element transformation. The masking function may include a geometric shape or simply a collection of arbitrary data elements in the transform memory. The purpose of the masking function is to define an exclusionary data set in the data transform space for the iterative process.

Figure 9:
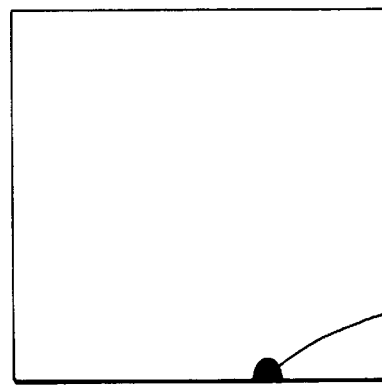
FIG. 9 illustrates a data masking function that may be incorporated with the affine maps of FIG. 7 to generate an attractor that more accurately represents the object depicted in FIG. 8.

An example of such a masking function or data mask is shown by the shaded region 92 in FIG. 9. Such a mask may be defined by a mathematical equation or it may be defined by an operator clicking on points in a display to form the polygon that defines the data masking region. Alternatively, a user could define the mask by identifying the x, y coordinates or the like that define the vertices of a polygon or simply identifying the data set elements which form a data masking function. Preferably, a system that permits an operator to define the masking function by using a mouse includes a display so the operator may view the data set to be reproduced and the selected mask. Thus, the user would be able to manipulate the mouse more easily at the vertices which appear to be related to the boundary of the data set to be represented. Alternatively, the data mask generator 16 may randomly select a data masking function or select a data masking function that complements a data set transformation function selected by data function generator 14. For example, a data masking function that follows the boundaries of a data transformation function or which fits between data transformations comprising a data transformation function may be selected by data mask generator 16.

The mathematics which support the use of a data mask may be stated as follows. Let K denote an n-dimensional space which may be represented as $R^n$ where $n=1,2,3\ldots$. A masked data transformation function system of order N consists of a space K together with a collection of N continuous, contractive transformation functions $\{W_i: i=1, 2, \ldots N\}$ from K to K together with the definition of an exclusionary set which may be represented by a line when N=1, a polygon when N=2, or a polytope when N>2. Alternatively, the exclusionary set may be comprised of data space elements in N space which can be as simple or as complex a subset of K as desired.

For example: if n=2 then K=$R^2$ (Euclidean space) and the $W_i$ are often of the form:

$$W\begin{pmatrix}x\\y\end{pmatrix} = \begin{pmatrix}a & b\\c & d\end{pmatrix}\begin{pmatrix}x\\y\end{pmatrix} + \begin{pmatrix}e\\f\end{pmatrix}$$

The symbols a, b, c, d, e and f are real constants or coefficients which specify the function. These transformation functions are merely exemplary as the invention is envisioned as being applicable to other transformations such as complex or non-linear transformations within the space K. A continuous function W: K→K is said to be mathematically contractive if it always decreases the distance between points. Let the distance between two points x and y in the space K be denoted by |x-y| then W is contractive with contractivity factors such that $0 \leq s < 1$ if $|W(x)-W(y)| \leq s|x-y|$, for all pairs of points (x,y) in K. In the example transformation noted above, the six real coefficients are chosen to ensure that all the $W_i$ are contractive within $R^2$.

The examples above assumed that the space K was made up of physical points. For example: $R^1$ is a real line and $R^2$ is an Euclidean plane. However, the space K may be any compact metric space which is a term well known to those skilled in the art. For example the space K could be the space in which each point is a continuous function such as a density or color intensity for a grayscale or color image pixel.

Let an iterative system be applied to a set of points A in K to transform it to a new set of points A':

$$A' = \bigcup_{i=1}^{N} Wi(A)$$

If A=A' then an invariant set of points has been found that form an attractor under this iterative system. U.S. Pat. No. 4,491,193 shows that an unique invariant set of points exists under suitable conditions of contractive factors for the $W_i$. This invariant set of points is referred to as the attractor for the data set transformation function comprised of the data transformations. An automatic method for selecting a set of data transformations using a fractal transform method is also shown in U.S. Pat. No. 5,065,477 and this method may also be used with the present invention.

A simple data mask may be a collection of (x,y) coordinate pairs which define a simple, closed polygon. Let M⊂K be a data mask so defined. Then the complement of the mask is $M^c$=K\M, where the symbol "\" is the set subtraction operator. That is, $M^c$ is the set of data elements in space K which are not within the mask polygon. Applying a data transformation function with a data mask yields:

$$A' = \bigcup_{i=1}^{N} Wi(M^c \cap A)$$

If A'=A then an invariant set of points has been found that form an attractor under the iterative data transformation and data mask system.

Figure 10:
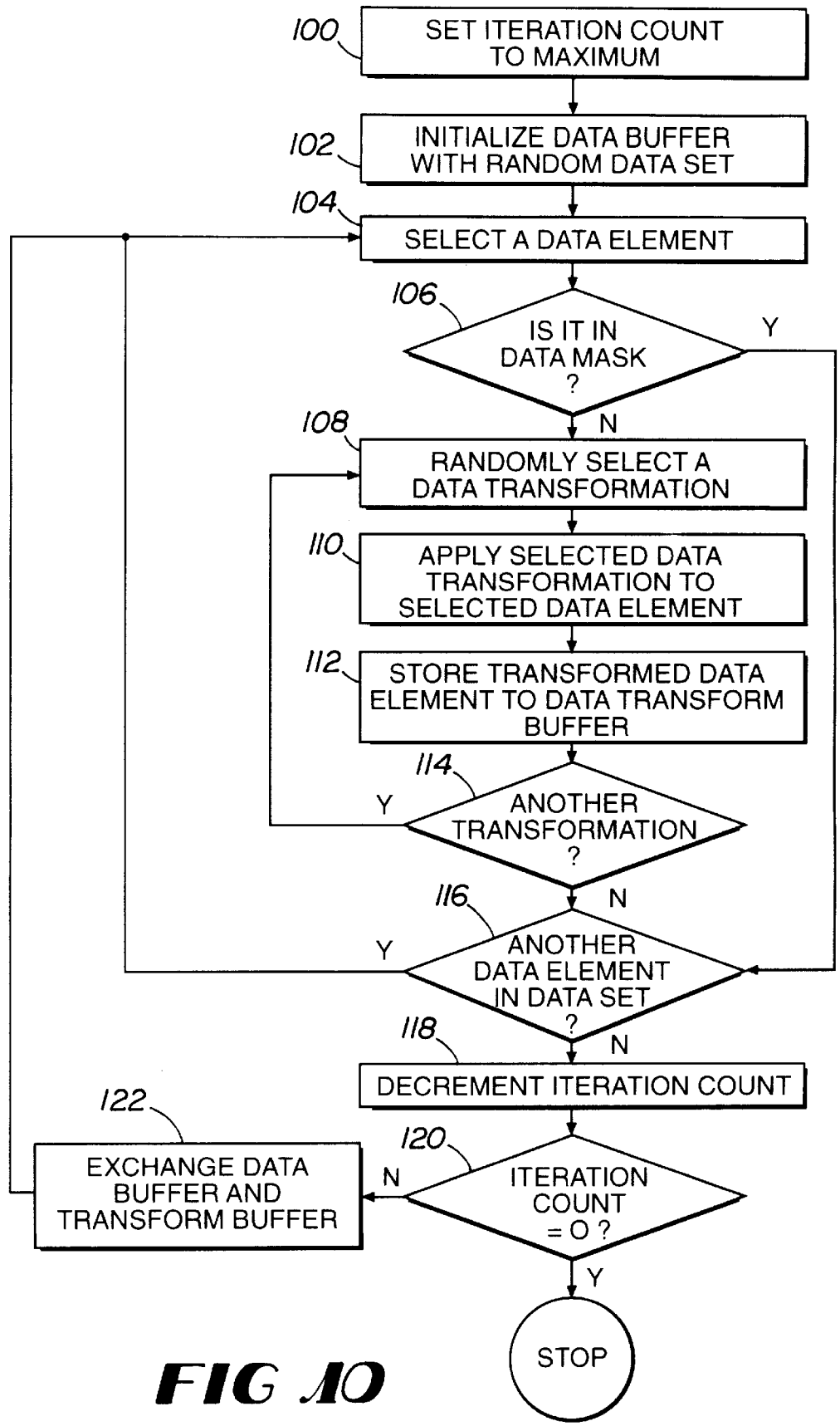
FIG. 10 is a logic diagram of a deterministic process used to generate an attractor from a data transformation and data masking functions of the present invention.

The data transformation and data masking functions may be used in a deterministic process to generate an attractor for representing an original data set by the method shown in FIG. 10. The method begins by setting an iteration count to a predetermined maximum value (Step 100) and initializing a data buffer with a random data set (Step 102). The masking data function is used to identify data elements in the data buffer which are not transformed. The process continues by applying every data transformation of a transformation function to data elements of the random data set in the data buffer which are not in the data masking function (Steps 104–116). The resulting transformed data element for each applied data transformation is stored in a data transform buffer (Step 112). After each data transformation has been applied to each data element of the random data set, the initial iteration is complete. The iteration count is then reduced by one. (Step 118). If the count is non-zero, the data buffer is cleared and the data transformations are applied to the data elements in the data transform buffer which are stored in the data buffer. (Steps 120–122). This may be done by exchanging the content of the buffers or a flag identifying the buffers or any known method for altering the source and destination buffers for a process. The steps of storing transformations of the data elements of one data buffer in the other data buffer is repeated until the iteration count is zero. (Step 112). At that time, the attractor that represents the original data set is stored in the data buffer containing the latest transformed data elements.

Alternatively, the process may measure an error difference between the data and transform buffer after all the elements of one buffer have been transformed. If the error difference exceeds a predetermined threshold then the data elements of the buffer in which the transformed elements were stored are then transformed and stored in the other buffer. If the error difference is less than or equal to the threshold, the transformation of the data elements in the buffers is halted and the last stored buffer contains the attractor representing the original data set. Otherwise, the buffer storing the most recently transformed elements are transformed using the data transformation function and data masking function and the resulting transformed elements stored in the other buffer. The error distance may be measured by one of a Hausdorff, Hamming, or least squares distance or equivalent method.

Figure 11:
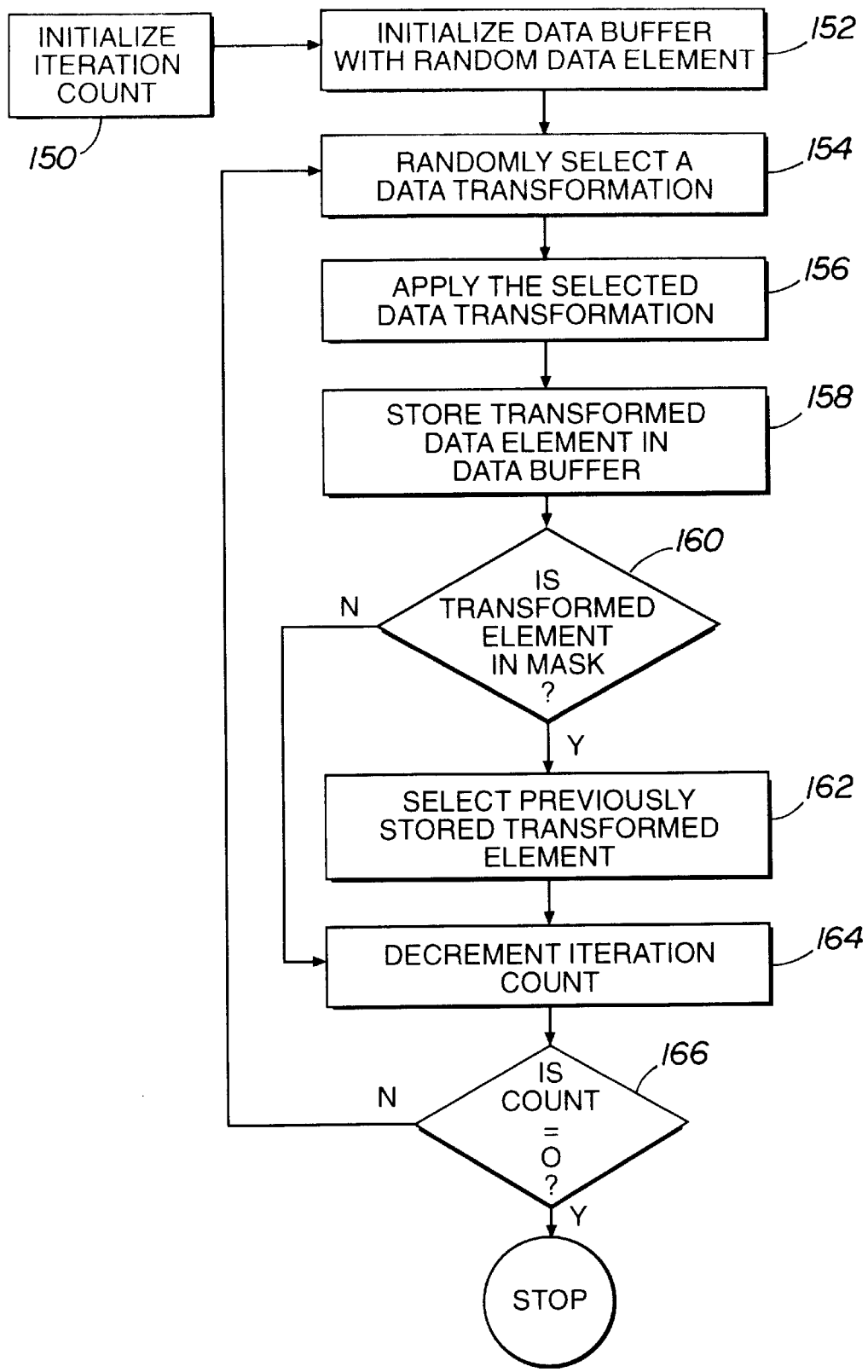
FIG. 11 is a logic diagram of a random process used to generate an attractor from a data transformation and data masking functions of the present invention.

A random iteration process which may be used to generate the attractor from the coefficients for the data transformation and data masking functions is shown in FIG. 11. That method begins by initializing an iteration count to a predetermined value (Step 150) and a random data element in a data buffer (Step 152). The process continues by randomly selecting and applying one of the transformations of the data transformation function. (Step 154–156). The transformations comprising the transformation function may be assigned probabilities and these probabilities may be used to randomly select the transformations. The transformed data element is then stored in the data buffer (Step 158) and tested to see if it lies within the data masking set. (Step 160). If the data element is within the masking function, the process selects the last transformed data element stored in the data buffer (Step 162) before it determines whether to continue the random selection and application of data transformations to data elements. (Step 164–166). Thus, the data masking function is used to halt the propagation of transformed data elements from the members of the exclusionary data set. After a predetermined number of iterations have been performed (Steps 164–166), the process terminates and the attractor representing the original data set is contained in the data buffer.

The data masking function may also be used with the fractal transform method disclosed in U.S. Pat. No. 5,065, 477. Incorporation of the data masking function in this method to encode data is shown in FIG. 12A. First, a data buffer is initialized with a data set (Step 200) which is divided into a plurality of domains which conform to certain requirements. (Step 202). The image is also used to generate a plurality of range blocks which must be larger than the domains. (Step 204). Additional range blocks are generated by using data transformation functions with a data masking function. For the transformations performed with the data masking function, a data transformation function is applied to the data elements of a range block which are not in the masking function and the transformed elements are stored in the transformed range block. (Steps 206–212). The process continues after the range blocks have been transformed by determining for each domain the range block which best matches the domain. (Steps 216–226). The data transformation function and data masking function for that range block, if used to transform the range block, are used to represent the domain block.

After a data transformation function and masking function have been selected for each domain, the coefficients are then transmitted to a receiver. The receiver performs the process discussed above with respect to system 70 to decompress each domain and regenerate an attractor representing the original data set. The match is determined by mapping a range block to a domain and computing an error measurement as discussed previously. The smallest error measurement indicates the best range block match. The use of the data masking function with the transformation function provides transformed range blocks which better represent the domains of the original data set.

The data masking function may be incorporated in the process shown in FIG. 12 in another way to more accurately represent data. The steps shown in FIG. 12B may be incorporated between steps 216 and 220. Such a process may or may not use a data masking function to transform range blocks. The steps shown in FIG. 12B use a masking function by identifying range blocks which are used in the comparision of a domain to a range block. This masking function may be differently defined for each domain.

The mapping of a range block to a domain in a data space where N=3 may be represented by the equation:

$$\begin{bmatrix} x \\ y \\ z \end{bmatrix} \rightarrow \begin{bmatrix} & 0 & \\ w & 0 & \\ a & b & c \end{bmatrix} \cdot \begin{bmatrix} x \\ y \\ z \end{bmatrix} + \begin{bmatrix} t_x \\ t_y \\ d \end{bmatrix}$$

where W is a two dimensional range block transformation and $t_x$, $t_y$ and d are translations in the x, y and z axes, respectively. A function representing an error distance between a domain and range block may be expressed in a least squares measurement, G (a,b,c,d), although other error measurements may be used. Thus, $$G(a,b,c,d) = \int_{domain} [f(w(x,y)) - ax - by - cf(x,y) - d]^2 dx dy$$

where z=f (x,y) is the gray scale intensity. This error measurement may be minimized by taking the partial derivative of the measurement with respect to each coefficient a,b,c, and d, setting each partial derivative equal to zero and solving the linear system of the four equations for the four unknowns, namely, the coefficients a,b,c, and d. These values may then be used to represent the data set of the range block.

The masking function of the present invention may be used to improve the match of the domain to range blocks by defining a domain so it more accurately conforms to a data subset having data elements which are related to one another. For example, in consecutive video frames a domain of an Nth frame may be compared to a range block of a N−1th frame. If domains conform well to range blocks within prior video frames, then the data masking function may be used to reduce the number of range blocks tested for an error measurement. If the difference between consecutive frames exceeds a predetermined threshold, then the set of difference values may be represented by a data transformation function and the time for calculating the coefficients may be reduced. Similarly, the masking function may be used in a data space application to exclude address spaces for data not relevant to an application. In this manner, a data element may be found in an address space without a tree search or other data element locating search.

Each of the methods set forth above may be used to produce resolution independent images. That is, regardless of the detail scale chosen for the image, no information content is lost. This property of iterated system and fractal transform systems are well known. However, the incorporation of the data masking function of the present invention more accurately provides detail in such images.

In operation, receiver 12 of system 10 in FIG. 1 receives a set of data elements from a source for compression. The data set may be a frame of video data, a PET image, a soundtrack segment that accompanies an image, or a schema for a database. A data transformation function is selected by data transform generator 14 and a data masking function is selected by data mask generator 16. The data transformation function and data masking function may be selected by interaction of an operator with system 10 or by the selection methods discussed above. Using the selected data transformation and data masking function, data transform generator 14 generates an attractor for representing the original data set received by receiver 12. The attractor may be generated, for example, by a random or deterministic method for an iterated function system, or it may be generated by a fractal transform method, or any other known method for generating attractors.

After the attractor is generated, the attractor is evaluated to determine whether it accurately represents the original data set. One way to evaluate the attractor is to compute the Hausdorff distance between the original data set and the attractor. If this measurement is below a predetermined threshold the coefficients for the selected data transformation and data masking functions may be transmitted to represent the original data set. If the measurement is greater than the predetermined threshold, the coefficients of the data transformation or the data masking function or both may be modified. After modification, the attractor is regenerated and the comparison test is repeated to determine whether the threshold has been met. The results of that test may be used to determine whether the modifications enhanced or degraded the accuracy of the attractor and that information may be used to select the next modification, if one is needed.

After appropriate data transformation and data masking functions are selected, the coefficients of the functions may be transmitted or, if a fractal transform method is used, the coefficients of the data transformations and data masking functions for the domains and the range data information may be transmitted to represent the data. The data decompressor located at the receiver then performs the attractor generation process performed by data transform generator 14 to generate the attractor that represents the original data set. The data of the attractor may then be used to drive a video imager, a sound system, a database system or the like.

Those skilled in the art will readily appreciate the various modifications and variations which may be made to the system and methods disclosed in this patent without departing from the spirit or scope of the present invention. For example, the system and method of the present invention may be adapted to incorporate data masking functions with complex, nonlinear data transformations. As a result, the system and method should not be limited to affine transformations or to iterated function systems or to fractal transform methods. The present invention covers such modifications and variations which are within the scope of the appended claims and their equivalent.

What is claimed is:

1. A method for representing a data set comprising the steps of:

selecting one of a complex, affine, and projective transformation function that generates an attractor that approximates a data set; and selecting a data mask function for constraining said attractor produced by said data set transformation function whereby said attractor more accurately represents said data set.

2. The method of claim 1 wherein said selecting transformation function step further includes the step of:

selecting a plurality of transformation functions to represent said data set.

3. The method of claim 1 wherein said selecting data masking function step further includes the step of:

selecting a set of exclusionary data elements.

4. The method of claim 3 wherein said selecting data exclusionary set including the step of:

selecting a polygon as said data masking function.

5. The method of claim 2 wherein said selecting transformation functions step further includes the step of:

selecting coefficients for each selected transformation function.

6. The method of claim 1 further comprising the step of:

evaluating said constrained attractor to determine an error between said constrained attractor and said data set to be represented; and modifying one of said selected transformation function and said selected data masking function in response to said determined error being greater that a predetermined threshold.

7. The method of claim 6 wherein said modifying step further includes the step of:

modifying at least one coefficient of said selected transformation function.

8. The method of claim 6, wherein said modifying step further includes the step of:

modifying data elements of an exclusionary data set comprising said data masking function.

9. The method of claim 7 further comprising the step of:

determining whether said modified transformation function and said selected data masking function generate an attractor that more accurately represents said data set.

10. The method of claim 10 further comprising the step of:

transmitting said coefficients of said modified transformation function and said data masking function so that a receiver may generate said attractor that represents said data set.

11. The method of claim 1 wherein said selecting transformation function step further includes:

selecting a fractal transform method to transform said data set.

12. The method of claim 11 further including the step of:

selecting a data masking function to constrain an attractor generated by transforming a range block.

13. The method of claim 1 further comprising the step of:

generating an error function which defines an accuracy error between said data set and said transformation function and data masking function; and minimizing said generated error function to reduce a set of coefficients to represent said data set.

14. A method for generating a transformed data set which represents a data set comprising the steps of:

initializing a data buffer with a random image;

applying one of a complex, affine, and projective transformation function to each data element of said random image and storing said transformed data element in a transform buffer unless said data element of said random image is within a data masking function;

measuring an error difference between said data elements of data buffer and said transform buffer;

exchanging said data buffer and said transform buffer; and repeating said applying, said measuring, and said exchanging steps until said error measurement does nor exceed a predetermined threshold so that said transformation buffer contains an attractor representing said data set.

15. The method of claim 14 wherein said error difference measuring step measures said error difference by computing one of a Hausdorff distance, a root mean square distance, and a Hamming distance.

16. The method of claim 14 further comprising the steps of:

measuring an error difference between said attractor and said data set being represented; and modifying one of said transformation function and said data masking function whereby said attractor generated by said modified data masking function and transformation function more accurately represent said data set.

17. The method of claim 16 wherein said error difference measuring step measures said error difference by computing one of a Hausdorff distance, a root mean square distance, and a Hamming distance.

18. A method for generating a transformed data set which represents a data set comprising the steps of:

initializing a data buffer with a random image;

applying one of a complex, affine, and projective transformation function to each data element of said random image and storing said transformed data element in a transform buffer unless said data element of said random image is within a data masking function;

decrementing an iteration count;

exchanging said data buffer and said transform buffer; and repeating said applying and said decrementing steps until said iteration count is zero so that said last buffer to which data elements were stored contains an attractor representing said data set.

19. The method of claim 17 further comprising the steps of:

measuring an error difference between said attractor and said data set being represented; and modifying one of said transformation function and said data masking function whereby said attractor generated by said modified data masking function and transformation function more accurately represent said data set.

20. The method of claim 19 wherein said error difference measuring step measures said error difference by computing one of a Hausdorff distance, a root mean square distance, and a Hamming distance.

21. A method of generating a transformed data set which represents a data set comprising the steps of initializing a data element in a data buffer;

applying one of a complex, affine, and projective data transformation function to transform said data element within said data buffer;

determining whether said transformed data element is within a data masking function;

applying said transformation function to one of said transformed element and a last transformed element in response to said determination of said transformed data element being within said data masking function;

decrementing an iteration count; and continuing said determining and applying steps until said iteration count is zero whereby said transformed data elements in said data buffer form an attractor that represents said data set.

22. The method of claim 21 further comprising the step of:

selecting a transformation from a set of transformations that comprise said data transformation function.

23. The method of claim 22 wherein said transformation is selected in accordance with a probability corresponding to said transformations comprising said transformation function.

24. The method of claim 22 wherein said set of transformations is a plurality of affine maps.

25. The method of claim 21 further comprising the step of:

defining said data masking function as a set of exclusionary data elements.

26. The method of claim 25 wherein said defining step further includes the step of:

selecting vertices which define a polygon.

27. The method of claim 26 wherein said selecting vertices step further includes the step of:

selecting said vertices being done interactively.

28. The method of claim 26 wherein said selecting vertices step further includes the step of:

identifying coordinates for said vertices.

29. The method of claim 26 wherein said selecting vertices step further includes the step of:

selecting a mathematical equation that defines said polygon.

30. The method of claim 21 further comprising the steps of:

measuring an error difference between said attractor and said data set being represented; and modifying one of said transformation function and said data masking function whereby said attractor generated by said modified data masking function and transformation function more accurately represent said data set.

31. The method of claim 30 further comprising the step of:

modifying coefficients of an affine map in response to a determination that said attractor does not conform to said set of data.

32. The method of claim 30 further comprising the step of:

modifying vertices of a polygon defining said data masking function in response to a determination that said attractor does not conform to said data set.

33. A system for generating an attractor from a data transformation function and a data masking function that represents a data set;

a data mask generator for generating a data masking function;

a data function generator for generating one of a complex, affine, and projective transformation function, said data function generator said said transformation function and said data masking function to generate an attractor; and a transmitter for transmitting said transformation function and said data masking function to a remote site for regeneration of sad attractor.

34. The system of claim 33 further comprising:

a comparator for comparing said attractor generated by said data function generator to a data set to be represented by said attractor, said comparator measuring an error distance between said data set and said attractor.

35. The system of claim 34 wherein said data function generator further comprises:

a coefficient modifier for modifying coefficients of said transformation function in correspondence with said error distance.

36. The system of claim 34 wherein said data mask generator further comprises:

a masking modifier for modifying said data masking function in correspondence with said error distance.

37. The system of claim 34 wherein said comparator further comprises:

an error function generator for generating an error function and minimizing said error function so that coefficients for said minimized error function may be used to represent said data set.

38. The system of claim 33 wherein said data function generator generates said attractor with a deterministic process.

39. The system of claim 33 wherein said data function generator generates said attractor with a random iteration process.

40. The system of claim 33 wherein said data function generator generates said attractor with a fractal process.

41. The system of claim 33 wherein said data function generator generates said attractor with a error function fractal process.

42. The system of claim 40 further comprising:

means for transforming range blocks with another data transformation and another data masking function whereby said transformed range blocks more accurately conform to domains generated from said data set.

43. The system of claim 40 further comprising:

means for using said data masking function to prevent comparison of a domain to a range block.

44. A system for representing a data set comprising the steps of:

means for selecting one of a complex, affine, and projective transformation function that generates an attractor that approximates a data set; and means for selecting a data mask function for constraining said attractor produced by said transformation function whereby said attractor more accurately represents said data set.

45. The system of claim 38 wherein said selecting transformation function means further comprises:

means for selecting a plurality of data transformations to represent said data set.

46. The system of claim 38 wherein said data masking function is a set of exclusionary data elements.

47. The system of claim 41 said data exclusionary set being a polygon.

48. The system of claim 39 further comprising:

means for selecting coefficients for each selected transformation function.

49. The system of claim 44 further comprising:
means for evaluating said constrained attractor to determine an error between said constrained attractor and said data set to be represented; and
means for modifying one of said selected transformation function and said selected data masking function in response to said determined error being greater than a predetermined threshold.

50. The system of claim 49 wherein said modifying means further comprises:
means for modifying at least one coefficient of said selected transformation function.

51. The system of claim 49 wherein said modifying means further comprises:
means for modifying data elements of an exclusionary data set comprising said data masking function.

52. The system of claim 50 further comprising:
means for determining whether said modified transformation function and said selected data masking function generate an attractor that more accurately represents said data set.

53. The system of claim 52 further comprising:
means for transmitting said coefficients of said modified transformation function and said data masking function so that a receiver may generate said attractor that represents said data set.

54. The system of claim 44, further comprising:
means for generating an error function which defines an accuracy error between said data set and said data transformation and data masking function; and
means for minimizing said generated error function to reduce a set of coefficients to represent said data set.

55. A system for generating a transformed data set which represents a data set comprising:
means for initializing a data buffer with a random image;
means for applying one of a complex, affine, and transformation function to each data element of said random image and storing said transformed data element in a transform buffer unless said data element of said random image is within a data masking function;
means for measuring an error difference between said data buffer and said transform buffer;
means for applying a data transformation function to each data element of said transform buffer and storing said transformed data element in said data buffer unless said data element of said transform buffer is with a data masking function in response to said error difference exceeding a predetermined threshold;
means for repeating said applying and said measuring steps until said error measurement does not exceed said predetermined threshold.

56. The system of claim 55 wherein said error difference measuring means measures said error difference by computing one of a Hausdorff distance, a root mean square distance, and a Hamming distance.

57. The method of claim 55 further comprising the steps of:
means for measuring an error difference between said attractor and said data set being represented; and
means for modifying one of said data transformation function and said data masking function whereby said attractor generated by said modified data masking function and transformation function more accurately represent said data set.

58. A system for generating a transformed data set which represents a data set comprising:
means for initializing a data buffer with a random image;
means for applying one of a complex, affine, and projective transformation function to each data element of said random image and storing said transformed data element in a transform buffer unless said data element of said random image is within a data masking function;
means for decrementing an iteration count;
means for applying one of a complex, affine, and projective transformation function to each data element of said transform buffer and storing said transformed data element in said data buffer unless said data element of said transform buffer is within a data masking function in response to said decremented iteration count being non-zero; and
means for repeating said applying and said decrementing steps until said iteration count is zero so that said last buffer to which data elements were stored contains an attractor representing said data set.

59. The system of claim 58 further comprising the steps of:
means for measuring an error difference between said attractor and said data set being represented; and
means for modifying one of said transformation function and said data masking function whereby said attractor generated by said modified data masking function and transformation function more accurately represent said data set.

60. A system of generating a transformed data set which represents a data set comprising:
means for initializing a data element in a data buffer;
means for applying one of a complex affine, and projective transformation function to transform said data element within said data buffer;
means for determining whether said transformed data element is within a data masking function;
means for applying said transformation function to one of said transformed element and a last transformed element in response to said determination of said transformed said element being within said data masking function;
means for decrementing an iteration count; and
means for continuing said determining and applying steps until said iteration count is zero whereby said transformed data elements in said data buffer form an attractor that represents said data set.

61. The system of claim 60 further comprising the steps of:
means for measuring an error difference between said attractor and said data set being represented; and
means for modifying one of said transformation function and said data masking function whereby said attractor generated by said modified data masking function and data transformation more accurately represent said data set.

62. The system of claim 61 further comprising:
means for modifying coefficients of said transformation function in response to a determination that said attractor does not conform to said set of data.

63. The system of claim 61 further comprising the step of:
means for modifying said data masking function in response to a determination that said attractor does not conform to said data set.

* * * * *